April 13, 1954     A. D. L. HUTCHINSON     2,675,268
ENDGATE CONTROL FOR TRUCK BODIES
Filed April 24, 1950
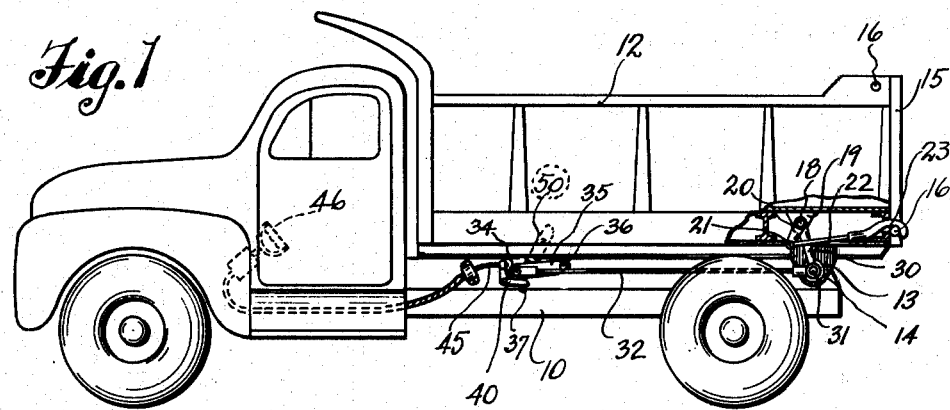
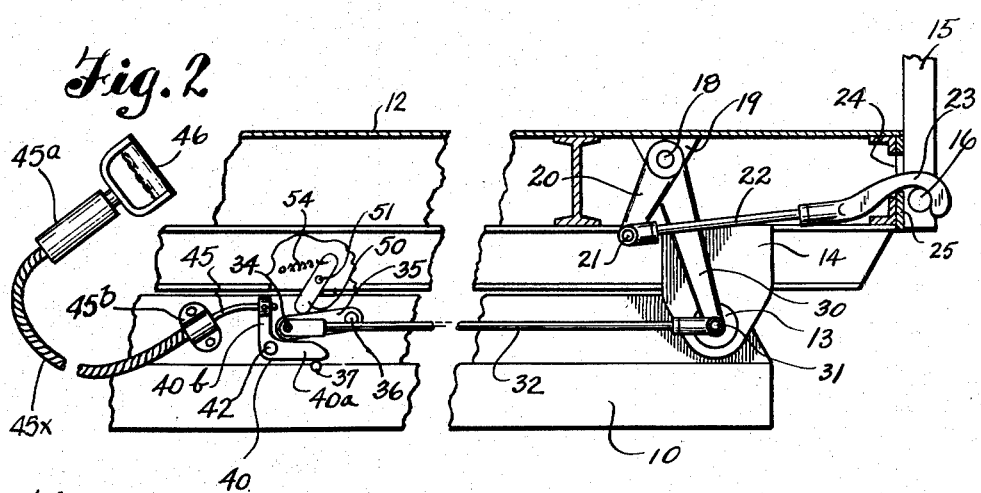
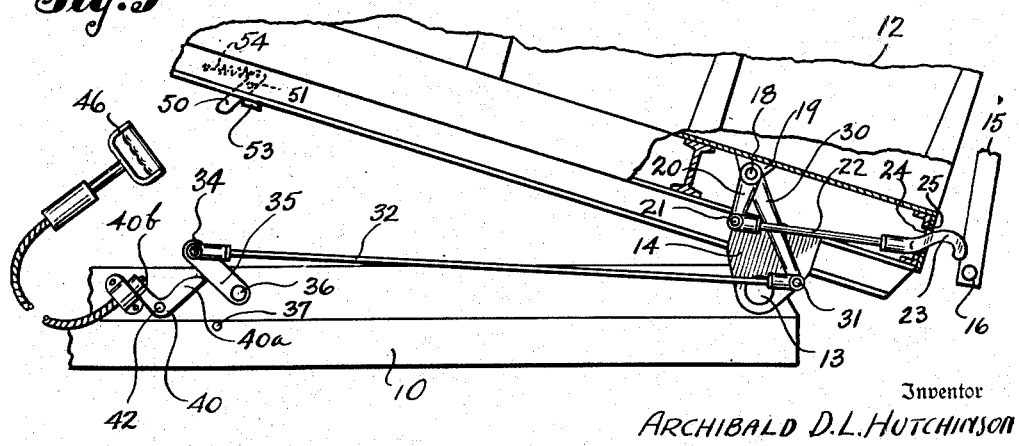
Inventor
ARCHIBALD D. L. HUTCHINSON
By Cook & Robinson
Attorney

Patented Apr. 13, 1954

2,675,268

UNITED STATES PATENT OFFICE 2,675,268

ENDGATE CONTROL FOR TRUCK BODIES

Archibald D. L. Hutchinson, Seattle, Wash.

Application April 24, 1950, Serial No. 157,729

4 Claims. (Cl. 298—23)

This invention relates to end gate latching and latch releasing means for dump truck bodies and the like, and it is the principal object of the invention to provide a gate latching means that will be automatically actuated to and secured in gate holding position with the lowering of the dump body to normal load carrying position and which may be manually released upon raising the dump body from its normal load carrying position.

The present invention is a modification of and improvement upon the gate latching device of my U. S. Patent No. 2,342,939.

More specifically stated, the objects of the present invention are to be found in the mounting of end gate latching devices on the dump body to move therewith, without relative change in position, and in the provision of devices on the frame or chassis of the truck through which automatic latching of the gate is effected and the latches secured when the body moves to fully lowered position, and through which release of the latches from the gate may be effected when the body is raised.

In accomplishing these and other objects of the present invention, I have provided the improved details of construction, the preferred forms of which are illustrated in the accompanying drawings, wherein—

Fig. 1 is a side view of a dump truck equipped with an end gate latching and latch releasing means embodied by the present invention; a part of the dump body being broken away for better showing of certain parts.

Fig. 2 is an enlarged, side elevation and partial section of a portion of the dump body showing the latching devices and latch release mechanism.

Fig. 3 is a similar view showing the dump body somewhat raised and the latch released from the end gate.

Referring more in detail to the drawings—

In Fig. 1, I have shown a conventional type of dump truck, comprising a wheel supported base frame or chassis 10 upon which a dump body 12 is hingedly mounted for rear end dumping. The body may be supported for its dumping action by any suitable means, but is here shown as being supported at its rear end by a cross-shaft 13 that is fixed in and extends between the opposite side beams of the chassis 10 near the rear end thereof and through hinge bearings 14 on the bottom of the body 12. When lowered to normal position, the dump body rests upon the chassis 10 as shown.

The raising and lowering of the dump body may be accomplished by any suitable mechanism which might be of a hydraulic, screw or of cable lift type, not herein shown. Hingedly applied to the rear end of the dump body 12, to serve as a closure therefor, is an end gate 15. This gate is supported at its upper end from the opposite side walls of the dump body through use of hinge bolts 16. As noted in Fig. 1, these bolts are set somewhat forwardly from the vertical plane of the open end of the body against which the gate closes in order that it will be caused to swing automatically to its closed position with the lowering of the body to the normal, horizontal position in which it is shown in Fig. 1.

At its lower corners the gate 15 is equipped with laterally projecting studs or pins 16, adapted to receive the gate latching hooks thereover. These hooks and their actuating means will now be described.

Extended transversely of the dump body, below the floor thereof and forwardly of the hinge shaft 13, is a cross-shaft 18, this is rotatably mounted in supporting brackets 19 attached to the floor or base of the dump body frame structure.

At each of its ends, the cross-shaft 18 has a downwardly forwardly directed lever arm 20 fixed thereto. Pivotally attached to the lower end of lever arm 20, by a pivot bolt 21, is the forward end of a latch lever 22 which, at its rear end, is equipped with a latch hook 23 adapted to be holdingly engaged with the corresponding gate stud or pin 16 to hold the gate closed.

The latch hook 23, as shown in the various views, has a downwardly opening hook seat. The end of the hook is downwardly curved to holdingly engage with the gate stud 16 and the hook shank is curved upwardly as it leads from the latch lever to the seat of the hook. The curved shank portion of the hook extends through and is slidably contained in a guide opening 24 formed in a cross plate 25 secured at the rear of the body frame as shown in Figs. 2 and 3. The curvature of the hook shank, and the arcuate travel of arm 20 to which it is attached provides that the sliding of the shank rearwardly in the guide opening 24 automatically effects the necessary lifting of the hook end to release it from the gate pin 16. Likewise, when the gate is closed, forward travel of the hook shank in the opening 24, as from position of Fig. 3, causes the hook end to be engaged with the pin 16 to secure the gate closed.

Fixed to the cross shaft 18 at one end thereof, is a relatively long, downwardly rearwardly directed lever arm 30, connected at its lower end, by pivot bolt 31, to a link 32 that extends forwardly along the chassis of the truck to a location below the forward end of the dump body where it is pivotally attached by a pivot bolt 34 to one end of a lever arm 35. The lever arm 35 is mounted by a pivot stud 36 on the side of frame 10, and extends forwardly from the stud, permitting its forward end to swing in a vertical arc. The levers and linkage above described are so connected and related that when the dump body 12 is lowered, and is resting on the chassis 10 in normal position as in Figs. 1 and 2, and the gate is closed, the pivot 31 is in exact axial alignment with cross-shaft 13, thus the body 12 may be raised and lowered about hinge shaft 13 without causing any relative movement of the latch hooks or their actuating levers.

Also, it is provided that when the body 12 is resting in lowered or normal position, and the gate is latched, as shown in Fig. 2, the lever arm 35 will extend forwardly and the plane of the axial lines of shaft 13 and pivot 34 will pass slightly below the center of pivot axis 36. When in this position, the forward end of lever arm 35 rests upon the horizontally and rearwardly directed arm 40a of a bell-crank lever 40 mounted on the chassis 10 by a pivot bolt 42. This arm is limited in its downward movement by a stud 37 in the frame 12. The bell crank also has a vertically directed lever arm 40b to which a flexible pull cable 45 is attached. The pull cable extends through a guide tube 45x, that has fixed supports 45a, 45b at its ends, to a position adjacent the driver's seat in the truck and preferably is there equipped with a handle 46 by means of which it may be pulled to cause the bell crank to be rocked from the position of Fig. 2, to the position of Fig. 3 thus to actuate lever 35 upwardly and through link 32, to release the gate. When the bell crank 40 is rocked to the position of Fig. 3, it causes the arm 35 to swing upwardly and rearwardly. The leg 40a of the bell crank 40 then is in position to serve as a supporting brace that prevents return of the lever 35 toward latch locking position until the handle 46 is pushed downwardly. As thus supported, the bell crank arm 40a serves with lever 35, link 32, lever 30, shaft 18 and arm 20, to hold the latch levers in released position. The handle 46 preferably will be located at a convenient position in the cab, out of the way of the operator in getting into or out of the cab. Whenever it is desired that the latch mechanism be released from position of Fig. 3 to permit the gate to be latched in closed position with the body, the operator pushes downwardly and forwardly on handle 46, thus to rock the arm 40a of bell crank 40 in the clear of lever 35. Then when the body moves to fully lowered position, the lever 50 pushes lever 35 to latch locking position.

It is also a feature of this invention that a downwardly and forwardly inclined lever 50 is pivoted on the base frame of the dump body by a pivot bolt 51. This lever is yieldingly held in this position, resting against a stop 53, by means of a coiled spring 54. When the dump body is lowered, the lever 50 engages at its lower end with lever 35 and pushes the latter from position of Fig. 3, to position of Fig. 2, thus to cause the latch hooks 23 to engage the gate pins 16 and secure the gate in closed position. The lever 35, upon lowering of the body is pushed downwardly slightly beyond dead center, and therefore will not be released even though the body be raised.

It is to be understood that the stop 53 limits the rearward travel of the lower end of lever 50, as attached by pivot 51, under the pull of spring 54, which is of such tension that the latching mechanism will be actuated upon lowering the dump body and engagement of lever 50 with lever 35. When the body is raised, the lever 50 moves away from the lever arm 35 and the gate may then be released by a pull on cable 45 that will cause the bell crank lever 40 to be actuated in a manner to kick the lever arm 35 upwardly over dead center to its released position. When the body is lowered from a raised position toward lowered position, the gate 15 swings automatically to closed position, then as the truck body comes to rest on the base frame, the gate latches are actuated.

The spring 54 is employed in connection with the lever 50 in order that no damage to the latching mechanism will result should the gate be hung up by a stone or other object catching between gate and body, and the latch actuating lever 35 not being able to complete its movement. In such case, the spring 54 yields and the body can come to rest without damaging effect on the latch mechanism.

The advantage of the pull cable and bell crank assembly resides in the fact that the handle 46 may be located at any position most convenient to the vehicle operator and out of the way of his entering or leaving the cab. Also, by use of a flexible shaft or cable connection between the handle 46 and bell crank 40, a more economical construction is provided, and it is possible to by-pass and avoid any interference with equipment such as tanks, battery box, pumps or the like that are generally carried on the vehicle. Furthermore, by reason of there being no positive connection between the bell crank 40 and lever 35, and by reason of use of an operating connection and handle of the kind shown, the driver is safe from accident that might otherwise result from being struck by a lever that is actuated by a sudden opening of the tail gate when the dump body is in a raised position. Such a flexible connection as here shown is especially adaptable to trucks of the tilting cab types.

In the foregoing description matter, I have described the bell crank lever 40 and lever 35 as being mounted on the vehicle frame. In this use of the term "vehicle frame" in the following claims, I wish to include any part of the structure that is relatively stationary with respect to the vehicle frame, since it is possible and quite probable that these levers may be mounted on the hoist frame or on some other structure that is not usually considered to be a part of the vehicle frame.

Having thus described my invention, what I claim as new therein and desire to secure by Letters Patent, is—

1. In a dump truck having a frame structure and a dump body mounted thereon for dumping about a horizontal hinge axis and an end gate for the body hingedly suspended from its upper end to swing between open and closed positions; a rocker shaft mounted in the body parallel to said hinge axis, a lever arm fixed on the rocker shaft, a latch connected with the lever arm for actuation thereby between gate holding and gate releasing positions, a rocker lever fixed on the rocker shaft for its actuation, a locking lever arm pivoted at one end on the vehicle frame forwardly of the body hinge axis and extended in a forward direction, a link connected at one end to the end of said locking lever arm and connected at its other end to the end of the said rocker lever for its actuation; said locking lever arm being adapted to be oscillated between a latch releasing position at one side of the dead center line of its pivotal mounting, to a latch holding position at the other side of its dead center line of pivotal mounting, a latch setting element mounted on the dump body and engageable with the said locking lever arm during final lowering movement of the dump body, to actuate the locking lever arm to latch holding position, and a release lever pivoted on the vehicle frame for oscillation between definite limits and serving when at one limit to stop the said locking lever arm as moved by said setting element at latch holding position, and a pull cable connected to said release lever for its actuation to move the locking lever arm to latch releasing position at its other limit.

2. Apparatus as recited in claim 1 wherein the said release lever is of bell-crank form and has one arm thereof extended to a position to actuate the latch locking lever arm to latch releasing position and to retain it in that position, and wherein said pull cable is attached to the other arm of the bell-crank for its actuation and control of position.

3. Apparatus as recited in claim 1 wherein the said latch setting element on the dump body is movably mounted, and a yieldable element is disposed to act thereagainst to normally retain it in position to actuate the latch locking lever arm, but yieldable to permit yielding movement of the member under abnormal resistance of the said locking lever arm to move to locking position.

4. Apparatus as in claim 1 wherein the point of connection of the said link with the rocker lever of the rocker shaft is aligned with the hinge axis of the dump body when the latches are in gate holding position.

References Cited in the file of this patent

UNITED STATES PATENTS

| Number | Name | Date |
|---|---|---|
| 1,381,495 | Pearson | June 14, 1921 |
| 2,278,446 | Hutchinson | Apr. 7, 1942 |
| 2,342,939 | Hutchinson | Feb. 29, 1944 |